United States Patent [19]

Schriner et al.

[11] Patent Number: 4,951,058

[45] Date of Patent: Aug. 21, 1990

[54] METHOD FOR REMOTE DETECTION OF ELECTRONIC BOMB FUZE

[75] Inventors: David A. Schriner, China Lake; Richard J. Lamp, Ridgecrest, both of Calif.

[73] Assignee: The United States of America as represented by the Secretary of the Navy, Washington, D.C.

[21] Appl. No.: 406,948

[22] Filed: Sep. 11, 1989

[51] Int. Cl.⁵ .............................................. G01S 13/00
[52] U.S. Cl. ........................................ 342/61; 342/175
[58] Field of Search ................ 342/175, 192, 42–44, 342/27, 61

[56] References Cited

U.S. PATENT DOCUMENTS

| | | | |
|---|---|---|---|
| 3,719,946 | 3/1973 | Sletten | 343/5 SA |
| 3,798,642 | 3/1974 | Augenblick et al. | 343/7 ED |
| 3,877,002 | 4/1975 | Cheal et al. | 342/192 |
| 3,972,042 | 7/1976 | Johnson | 343/17.2 PC |
| 4,068,232 | 1/1978 | Meyers et al. | 342/192 |
| 4,104,233 | 8/1978 | Erickson | 342/192 |

Primary Examiner—Thomas H. Tarcza
Assistant Examiner—Mark Hellner
Attorney, Agent, or Firm—Sol Sheinbein; Melvin J. Sliwka; Harvey A. Gilbert

[57] ABSTRACT

A method of remote detection of an electronic device, such as an electronic bomb fuze, which employs active electronic elements includes the steps of transmitting a radar beam through an object which potentially encloses a suspected bomb and receiving the reflections of the transmitted beam, using doppler radar techniques to detect signal phase and amplitude modulations, if any, and processing the reflections to provide an output resulting from any detected modulations which would indicate the presence of active electronic elements within the searched object.

8 Claims, 3 Drawing Sheets

METHOD FOR REMOTE DETECTION OF ELECTRONIC BOMB FUZE

BACKGROUND OF THE INVENTION

1. Field of the Invention

The present invention generally relates to remote detection of hidden bombs and, more particularly, to a method of remote detection of an electronic bomb fuze.

2. Description of the Prior Art

Present methods of hidden bomb detection typically employ X-ray techniques, metal detectors and visual observation. However, with respect to detection of a bomb fuze, these methods have significant drawbacks which limit their effectiveness.

X-ray techniques require recognizable images and patterns. A bomb fuze can be made that offers a very small pattern that could be masked by other items in a typical suitcase or other container. The X-ray view angle would have to be varied to many different angles in order to thoroughly scan all of the container and even then the fuze could be made so small that it could easily be hidden from view. A bomb could be configured like many objects normally found in a suitcase so the X-ray detector would not recognize the fuze or its elements.

Metal detectors would have a difficult time detecting a bomb fuze over the other metal objects normally found in a suitcase. Metal detectors measure the change in inductance caused by conductive or metallic material in the proximity of the sense coil. The amount of metal in a bomb fuze would be small compared to a coat hanger or other metallic object normally found in a suitcase. Furthermore, metal detectors can be avoided by use of non-metallic explosive devices.

Visual observation has obvious limitations. It requires that the suitcase be opened and visually examined. This procedure, although thorough, is slow and requires considerable baggage handling.

Consequently, in view of these limitations on the effectiveness of present bomb detection methods, a need still exists for a different approach which will avoid the drawbacks of the prior art approaches without substituting new ones in their place.

SUMMARY OF THE INVENTION

The present invention provides a method of remote detection of an electronic bomb fuze designed to satisfy the aforementioned need. The method of the present invention provides for remote detection of terrorist bomb fuzes through the use of micro phase and micro amplitude radar cross section modulations to a monostatic or bistatic radar beam.

Accordingly, the present invention is directed to a method of remote detection of an electronic device, such as an electronic bomb fuze, which employs an active electronic element. The remote detection method comprises the steps of: (a) transmitting a radar beam through an object which potentially encloses an electronic device having an active electronic element; (b) receiving the reflections of the transmitted beam; and (c) processing the reflections to detect signal phase and/or amplitude modulations, if any and provide an output resulting from any detected modulations which would indicate the presence of an active electronic element within the searched object. Such signal modulations are caused by conductance or reactance changes of an active semiconductor element in a variety of electronic circuits, including ones typically used for terrorist bomb fuzes, when these elements are switching "on" and "off" or are changing their conductivity.

Basically, the invention can be used to remotely detect any type of electronic device that employs switching semiconductor elements. However, in particular, the invention concerns the use of these modulations and their detection for the purpose of detecting the presence of active electronic elements of a bomb fuze timing device located in a suitcase or other type container. This method of remote detection allows the relatively quick scanning of a questionable package for such bomb fuze circuits.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

The present invention concerns a method of remote detection of a electronic device that employs active electronic elements, such as switching semiconductor elements. The primary application of interest is the remote detection of terrorist bomb fuzes which employ such active elements, although other applications are possible The same effects used to detect bomb fuzes may be used to detect other similar devices used in military weapons such as missiles, communication and radar equipment, and other similar equipment.

The method employs a radar beam or signal transmitted toward the object of interest and received after reflecting off or passing through the object. If the object contains actively operating electronic elements, they will cause modulations of the radar signal These modulations of the radar signal, characterized as micro phase and/or micro amplitude in nature, are caused by the conductance or reactance changes of the semiconductor elements of the circuits when these elements are switching "on" and "off" or are changing their conductivity. These modulations can be detected through use of a doppler radar technique that detects phase and amplitude modulations and provides an output resulting from these modulations. The present invention particularly concerns using these modulations for the purpose of remotely detecting the presence of a bomb fuze timing device hidden in a suitcase or other type container.

Semiconductors used in timing circuits are primarily switching elements such as transistors or diodes that are either in the "on" or "off" state. These elements are typically arranged in stages such that the high frequency signal from a clock oscillator (not a switching circuit but a linear circuit in this case) are divided to lower frequencies. The outputs from the divider chain are used to control logic gates that perform decode functions required to drive indicators (generally LCD panels) or alarm sonic devices. These semiconductor circuit elements are combined in a single integrated circuit in most cases although some clock circuits could be made using several integrated circuits on a PC board.

When the radar signal is incident to an integrated circuit, or a group of integrated circuits, the reflected signal in the monostatic case, or the passed-through signal in the straight line bistatic case, is modulated by the reflectivity or the loss of the involved semiconductor elements. These elements, if turned on, represent a good reflector, but if turned off, a poor reflector. In the pass-through case, the element when turned on does not pass the RF signal as well as when turned off. When the spacing of the elements and their ground plane (or the inter-element spacing) is a significant part of a wavelength, then the doppler detector (which is really a phase detector) will produce a level change because of these micro phase modulations on the reflected (or passed-through) signals.

Figure 1:
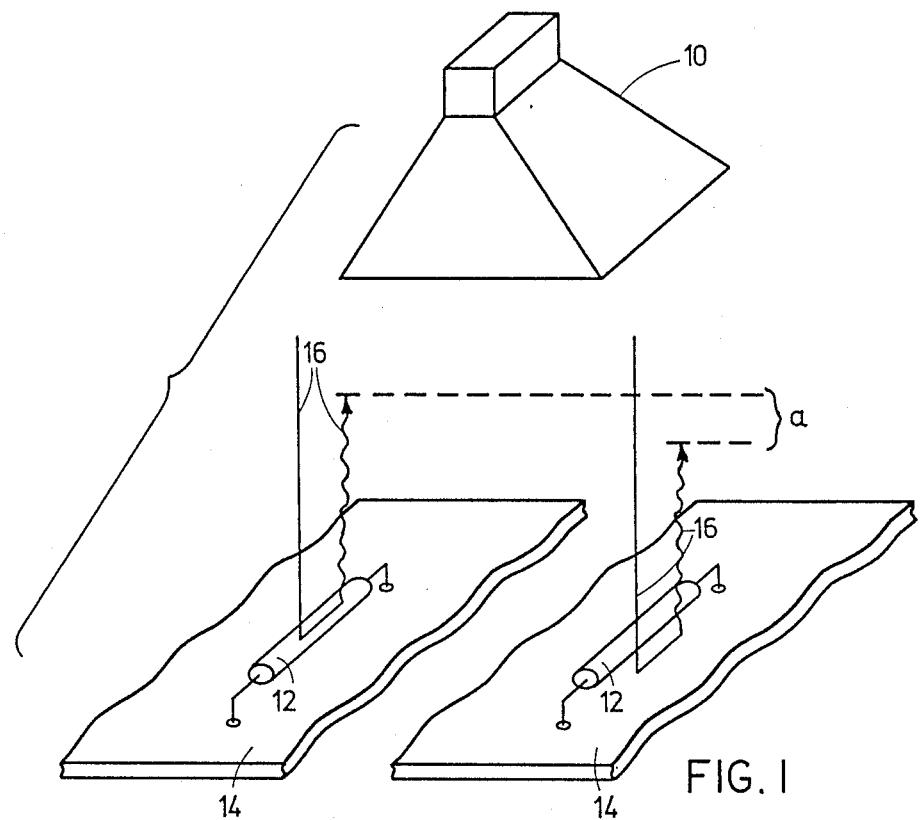
FIG. 1 is a schematic illustration of a monostatic radar beam employed in accordance with the method of the present invention for remotely detecting an active electronic element mounted on a conducting ground plane.
Figure 2:
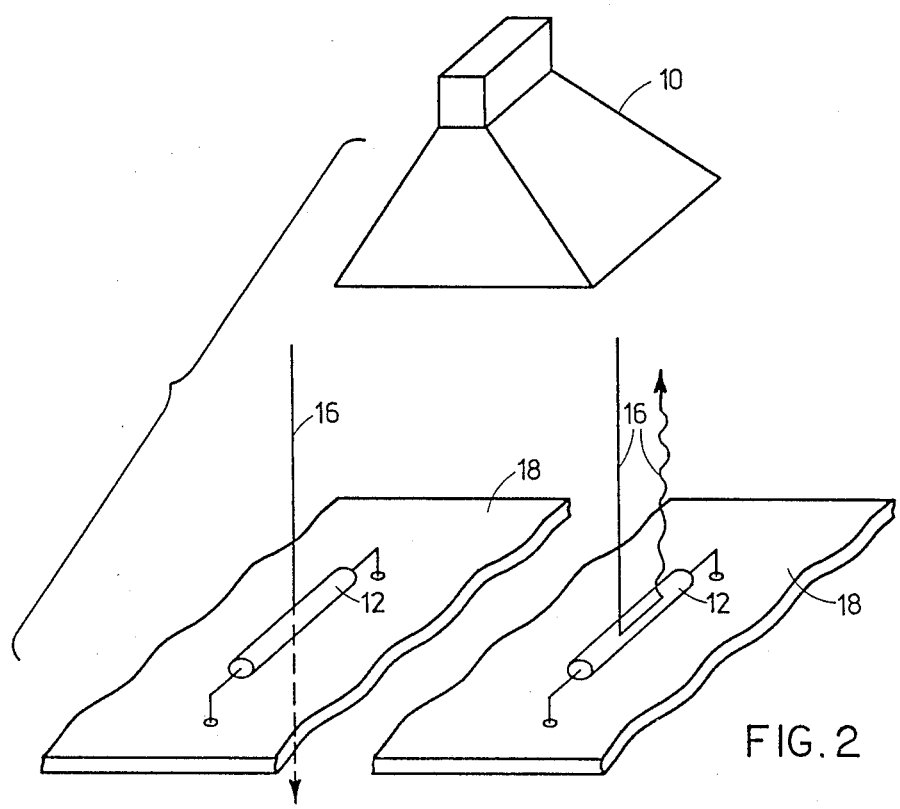
FIG. 2 is a schematic illustration similar to FIG. 1, except that the electronic element is mounted on a nonconducting ground plane.

Referring now to the drawings, and particularly to FIGS. 1 and 2, there is shown schematic illustrations of a radar beam used in accordance with the remote detection method of the present invention for remotely detecting an active electronic element mounted on a conducting ground plane and a non-conducting ground plane, respectively. In FIG. 1, a radar transceiver 10 is located remote from an electronic semiconductor element in the form of a diode 12 mounted on a conductive ground plane 14 and disposed in spaced relation thereabove. The transceiver 10 transmits a monostatic radar beam or signal 16 toward the diode 12 and ground plane 14 and receives back a reflection of the radar signal therefrom. When the diode 12 is turned "off", as represented on the right in FIG. 1, it does not reflect the radar signal 16 back to the transceiver 10 to the same extent as when it is turned "on" as represented on the left in FIG. 1. Thus, if the diode 12 is cycling on and off, the output of a phase detector (not shown) of processing apparatus connected to the radar transceiver 10 will produce a step in the amplitude of the signal due to the phase modulation "a".

The same "on" and "off" conditions of the diode 12 cause a similar effect when the diode 12 is mounted on a non-conducting circuit board or ground plane 18, as shown in FIG. 2. However, in this arrangement, there is no return reflection of the radar signal 16 when the diode 12 is turned off, as represented on the left in FIG. 2, compared to the reflection received when the diode 12 is turned on, as represented on the right in FIG. 2.

Because of the small spacing of typical integrated circuit elements, it is required that the wavelength be very small. Components operate at 10 GHz where the wavelength is about 3 cm. Signals from digital watches and timing circuits are best detected if millimeter wavelengths are used. The magnitude of the output voltage step, for instance at 10 GHz, would be increased nearly three times if the frequency is increased to 30 GHz and nearly 10 times if the frequency were increased to 90 GHz. At these higher frequencies, the antenna pattern would be much more narrow requiring that the radar detector be scanned over the package containing the bomb. In the 10 GHz case, the beam is much broader requiring fewer scanning paths.

If the remote detection method is employed in an arrangement used in conjunction with a conveyor belt type search system, then a lower frequency would be preferable. If a flashlight type of search apparatus employs the remote detection method, it is preferable to use a higher frequency since the radar beam would be positioned to one specific zone of interest. Because of the smaller phase steps involved in the lower frequency approach, some degraded sensitivity would result. Greater sensitivity would result using the highest frequency but the sensing spot would be smaller. Signal processing, taking advantage of the periodic nature of the modulation, can be employed to increase the sensitivity in either case.

In a breadboard unit operating at 10 GHz, very small single IC timing circuits and watches could be detected at about 12-inch ranges without signal processing and with a degraded receiver approach. It is expected that this range could be increased to one meter using signal processing and a more optimum detection approach. With millimeter wavelength frequencies, processing, and improved detectors, the range is expected to be greater than three meters.

Figure 3:
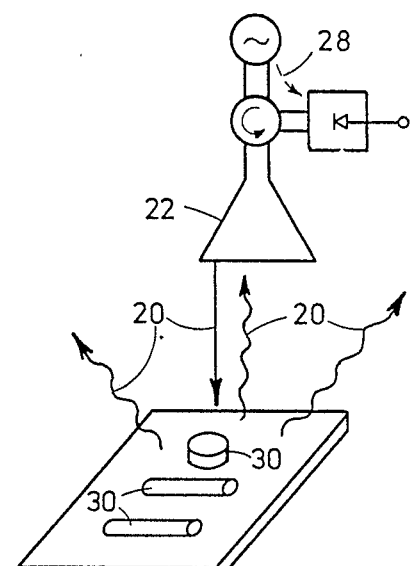
FIG. 3 is a schematic illustration of a monostatic radar beam and transceiver employed in accordance with the method of the present invention for remotely detecting active electronic elements.
Figure 4:
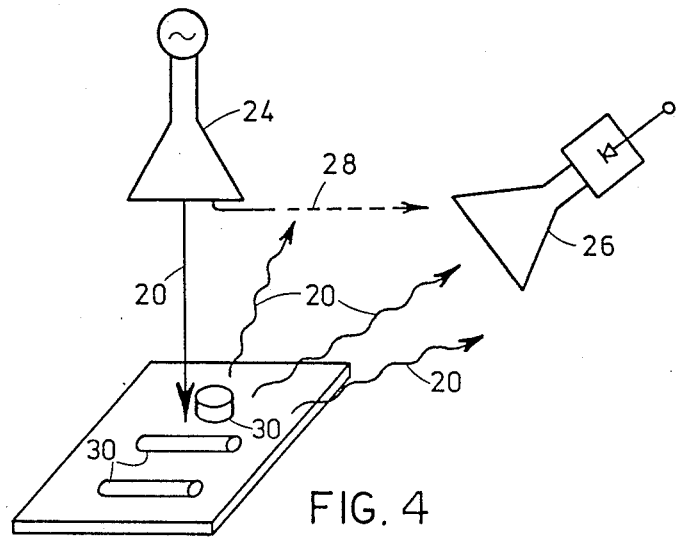
FIG. 4 is a schematic illustration similar to FIG. 3, except that a bistatic radar beam and separate transmitter and receiver are employed.

FIGS. 3 and 4 are schematic illustrations of implementations of the remote detection method of the present invention. In FIG. 3, a monostatic radar beam 20 and a transceiver 22 are employed, whereas in FIG. 4 separate transmitter 24 and receiver 26 are used. In both implementations, illustrated also are a RF single source 27 and a reference signal 28 which are employed in a known manner. In FIG. 3, the Rf radar signal is reflected back to the collocated transceiver 22 which detects the monostatic micro phase and micro amplitude modulations caused by the semiconductor elements 30 of an electronic bomb fuze switching off and on or the reactive modulations caused by the semiconductor elements 30 not in a switching mode. In FIG. 4, the bistatic configuration is used to detect functioning of electronic circuit elements 30. Here, in the extreme case, the transmitter 24 transmits through the electronic elements 30 and the micro phase and micro amplitude modulations are detected by the receiver 26 of the radar.

Figure 5:
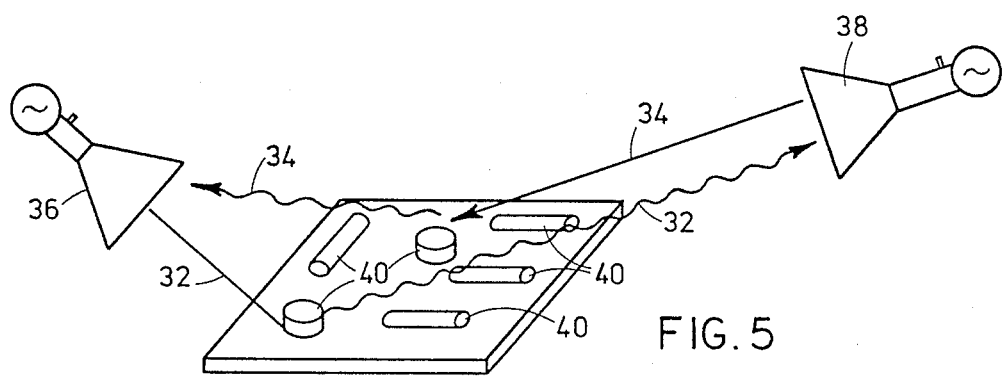
FIG. 5 is a schematic illustration of a pair of superhetrodyne monostatic radar beams and transceivers employed in accordance with the method of the present invention for remotely detecting active electronic elements.

FIG. 5 is a schematic illustration of an arrangement which is a modification of FIGS. 3 and 4. Two superhetrodyne monostatic radar beams 32 and 34 and transceivers 36 and 38 are employed in accordance with the method of the present invention for remotely detecting active electronic elements 40 of an electronic bomb fuze. The two transceivers 36 and 38 are aimed at one another and forced to operate at some mutual offset intermediate frequency. This configuration allows each radar unit detector to produce an intermediate frequency at its output that contains the above-mentioned modulations. These signals can then be amplified at the offset intermediate frequency thus providing greater sensitivity since the 1/F or flicker noise is eliminated. In either of these configurations the active electronic elements 40 of the bomb fuze generate micro phase and micro amplitude modulations that are detected by the radar units.

Since a bomb fuze generally employs electronic timing circuits that divide a stable clock signal down to a one per second frequency and further down to one per minute and eventually to one per hour divisions, signal processing techniques can be employed that take advantage of this orderly timed relationship between all of the modulation components caused by these dividers. This type of signal processing will allow an improvement in detection sensitivity and a reduction in the false alarm rate of the device. Any signal processing arrangement suitable for extracting formation from conventional radar signals corresponding to the position and motion of a target would be directly applicable to extracting information corresponding to clock signals generated by a timer circuit of an electronic bomb fuze. Functionally identical processing may be carried out by a bank of filters, such as those disclosed in U.S. Pat. Nos. 4,389,647 and 4,400,647, the disclosures of which are incorporated by reference, such filter banks being well known in radar systems for automatic processing of doppler returns expected over a range of frequencies.

Figure 7:
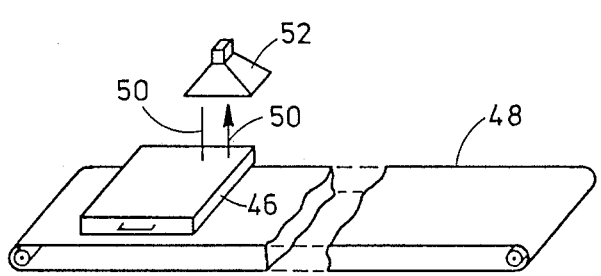
FIG. 7 is a schematic illustration of a monostatic radar beam and transceiver employed in accordance with the method of the present invention for remotely detecting an active electronic element of a device by scanning a suitcase while transported on a conveyor.
Figure 6:
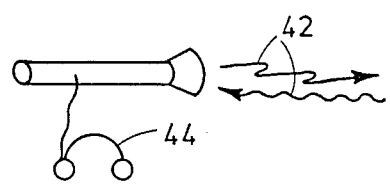
FIG. 6 is a schematic illustration of a monostatic radar beam and earphones employed in accordance with the method of the present invention for remotely detecting an active electronic element.
Figure 8:
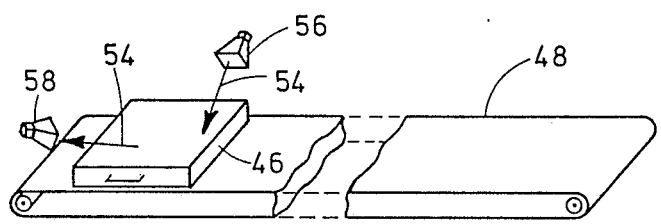
FIG. 8 is a schematic illustration similar to FIG. 7, except that a bistatic radar beam and separate transmitter and receiver are employed.
Figure 9:
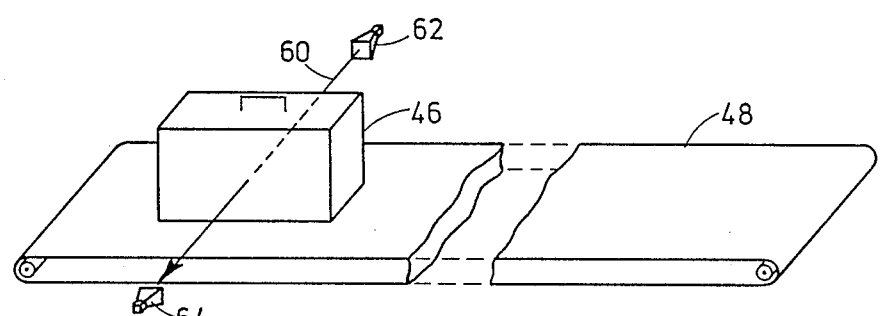
FIG. 9 is a schematic illustration of a pass-through one-way bistatic radar beam and separate transmitter and receiver employed in accordance with the method of the present invention for remotely detecting an active electronic element of a device by scanning a suitcase while transported on a conveyor.
Figure 10:
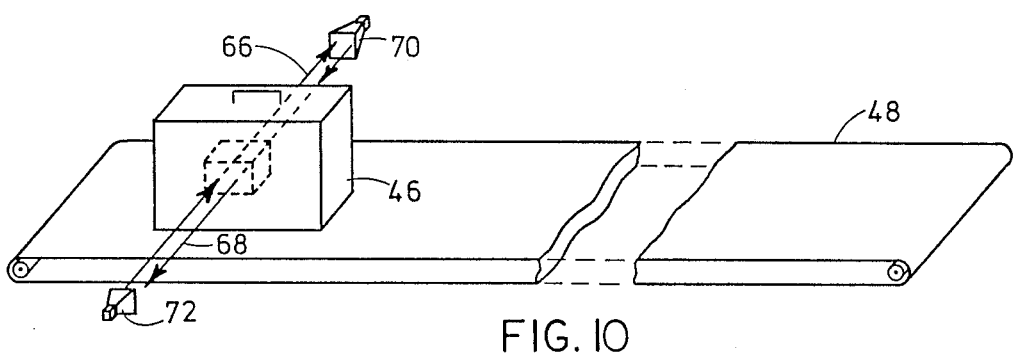
FIG. 10 is a schematic illustration similar to FIG. 9, except that a pair of pass-through two-way superhetrodyne bistatic radar beams and transceivers are employed.

FIGS. 6-10 are schematic illustrations of various configurations which can be used depending on the required search function. In FIG. 6, a monostatic radar beam 42 and conventional earphones 44 are employed so that the modulations can be audibly detected and analyzed by the sense of hearing. FIGS. 7-10 show the method used in conjunction with the scanning of a suitcase 46 while transported on a conveyor 48. In FIG. 7, a monostatic radar beam 50 and transceiver 52 are employed in the same manner as described with respect to the arrangement in FIG. 3 for remotely detecting an active electronic element of a bomb fuze hidden in the suitcase 46. In FIG. 8, a bistatic radar beam 54 and separate transmitter 56 and receiver 58 are employed in the same manner as described with respect to the arrangement in FIG. 4 for remotely detecting an active electronic element of a bomb fuze hidden in the suitcase 46. In FIG. 9, a pass-through one-way bistatic radar beam 60 and separate transmitter 62 and receiver 64 are employed for scanning the suitcase 46 moving with the conveyor 48. Finally, in FIG. 10, a pair of pass-through two-way superhetrodyne bistatic radar beams 66 and 68 and transceivers 70 and 72 are employed in a similar manner as described with respect to the arrangement in FIG. 5.

It should now be apparent that the remote detection method of the present invention eliminates the problems associated with other prior art methods which have been described previously. With respect to the radar-based method of the present invention, the following attributes result in considerable advantages over the prior art method of the present invention, the following attributes result in considerable advantages over the prior art approaches: (1) only active electronic circuits will cause a detection; (2) a single scan of a suitcase would examine the whole contents; (3) other metal contents will not cause a false alarm; (4) the technique can operate without human involvement; and (5) the radar signal will bounce off of surfaces and illuminate into remote corners and spaces when used in the flashlight mode.

In addition to bomb fuze detection, the remote detection method of the present invention can be used in related detection applications where similar electronic circuits are employed. Such related applications can include detection of: (1) mine fuzes; (2) guided missile and other types of weapon guidance systems, fuzes, and control electronic circuits; (3) bugging devices hidden in walls, telephones, or clothing; and (4) hidden mircroprocessor-based devices.

The remote detection method can also be used to capture the "signature" of any given electronic device and then to sort one type of electronic device from another. With this feature, an active device can be characterized concerning its status or operating mode such that an "armed" device can be sorted from an "unarmed" device. The signature feature could be used to test the normality of a given electronic device. For example, the signature of a clock circuit or a complex electronic device could be used to indicate if the device was operating normally.

Further, the remote detection method of the present invention could be used to augment existing detection radar systems that are employed to track or detect threats that contain active electronic circuits. Using this method, one type of threat could be sorted from another and the seeker to be blinded. The method described herein would permit the detecting radar to measure the effects of the jammer on the threat missile or other threat system.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

Having thus described the invention, what is claimed is:

1. A method of remote detection of an electronic bomb fuze having an active electronic element, said remote detection method comprising the steps of:
   (a) transmitting a radar beam through an object which potentially encloses a suspected bomb having an active electronic element;

(b) receiving the reflections of the transmitted beam; and (c) processing the reflections to detect signal modulations, if any, and provide an output resulting from any detected modulation which would indicate the presence of an active electronic element within the searched object.

2. The remote detection method of claim 1 wherein said transmitting and receiving are carried out by a monostatic radar beam.

3. The remote detection method of claim 1 wherein said transmitting and receiving are carried out by a bistatic radar beam.

4. The remote detection method of claim 1 wherein said transmitting and receiving are carried out by a pass-through one-way bistatic radar beam.

5. The remote detection method of claim 1 wherein said transmitting and receiving are carried out by a pair of pass-through two-way bistatic radar beams.

6. The remote detection method of claim 1 wherein said transmitting and receiving are carried out by a pair of superhetrodyne monostatic radar beams.

7. The remote detection method of claim 1 wherein said transmitting and receiving are carried out by a pair of pass-through two-way superhetrodyne bistatic radar beams.

8. The remote detection method of claim 1 wherein said transmitting and receiving are carried out by scanning the object while the object is moving.

* * * * *